Dec. 20, 1927.  1,653,600
H. M. R. DAM
ELECTRIC BATTERY CELL UNIT AND PROCESS OF MAKING THE SAME
Filed Dec. 15, 1924   2 Sheets-Sheet 1
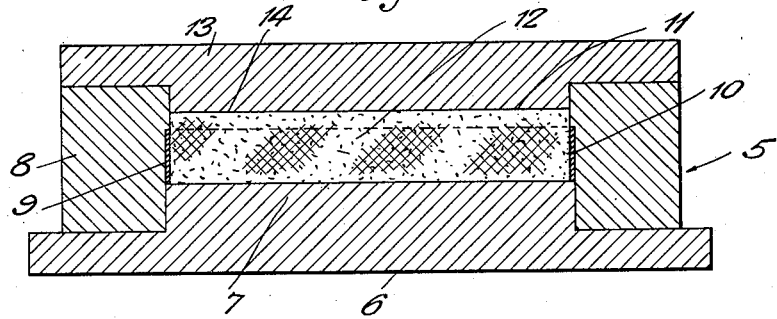
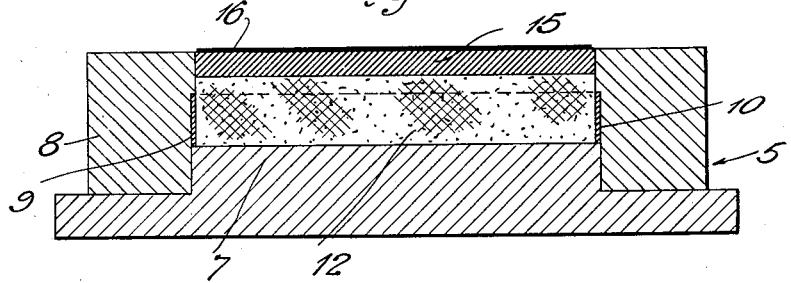
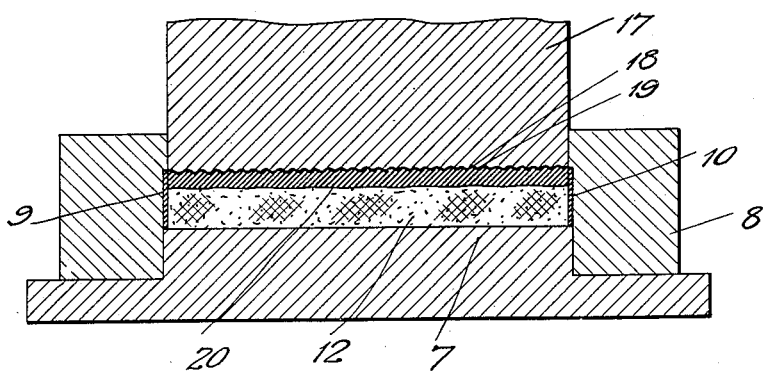

Dec. 20, 1927.　　　　　　　　　　　　　　　　　　　1,653,600
H. M. R. DAM
ELECTRIC BATTERY CELL UNIT AND PROCESS OF MAKING THE SAME
Filed Dec. 15, 1924　　　2 Sheets-Sheet 2
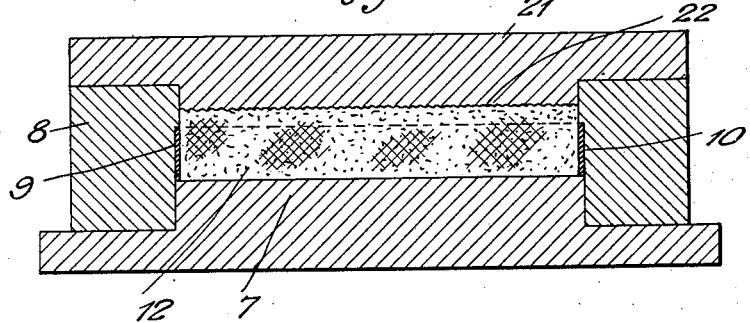
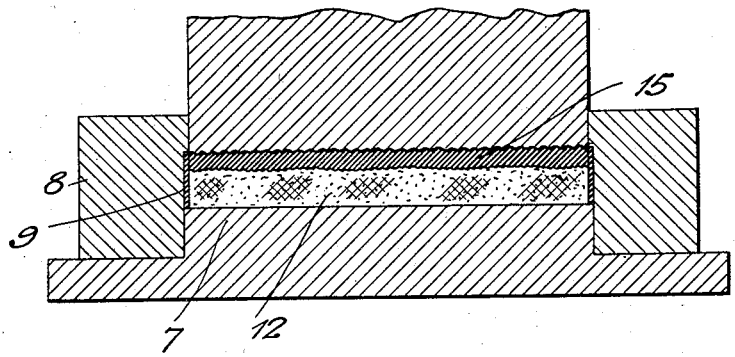
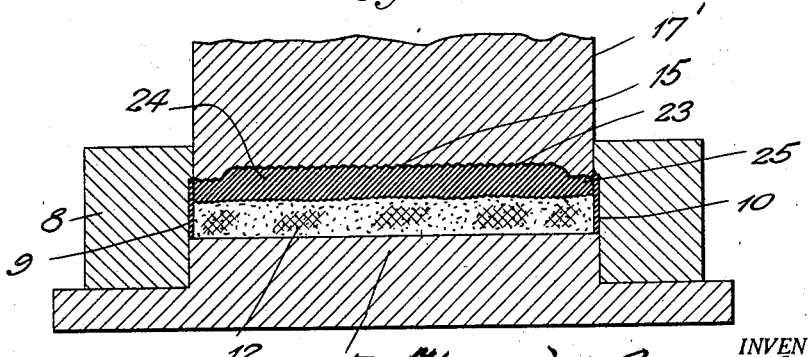
INVENTOR.
Henry M. Rosendale Dam
BY
Williams & Pritchard
ATTORNEYS

Patented Dec. 20, 1927.

1,653,600

UNITED STATES PATENT OFFICE.

HENRY M. ROSENDAL DAM, OF ASTORIA, NEW YORK, ASSIGNOR TO JOSEPH BLOCK, OF BROOKLYN, NEW YORK.

ELECTRIC-BATTERY-CELL UNIT AND PROCESS OF MAKING THE SAME.

Application filed December 15, 1924. Serial No. 755,880.

This invention relates to electric battery cell units of the flat type and to a process for manufacturing such units.

An important object of the invention is to provide a generally improved composite unit of the character mentioned together with an improved process for so intimately uniting the component parts thereof as to produce a compact, unitary structure offering among other advantages when incorporated into a cell or battery of cells a relatively low resistance to the flow of electric current.

Other objects and certain advantages of the invention will become apparent from the following description when taken in connection with the accompanying drawings in which—

Figure 1 is a vertical sectional view of a die employed in initially compressing a depolarizing mix, the depolarizing mix being shown as having undergone initial compression.

Figure 2 is a view similar to that of Figure 1 showing a layer of graphite ready to undergo compression incident to final compression of the depolarizing mix.

Figure 4 is a view simila rto that of Figure 1, the depolarizing mix being shown as having undergone final compression incident to the compression of the layer of graphite.

Figure 4 is a view similar to that of Figure 1 showing a modified form of die member having its compression face serrated.

Figure 5 is a view similar to that of Figure 3 showing the depolarizing mix and layer of graphite as having been intimately united incident to final compression of the depolarizing mix.

Figure 6 is a view similar to that of Figure 5 showing a somewhat modified form of die member employed in final compression of the depolarizing mix to produce a slightly modified form of cell unit.

In the drawings wherein for the purpose of illustration are shown certain apparatus for carrying out the several steps incident to the processes embodying my invention and wherein are also shown certain modified forms of cell units embodying my invention and constructed in accordance with these processes, the numeral 5 indicates a die or mould comprising a base 6 having a raised portion 7 about which is fitted a chase 8. This chase is so undercut, as shown, to form with the base 6 a groove or channel 9 adapted for the reception of a cardboard or other suitable frame 10 preferably impregnated with wax or a similar material to render it impervious to moisture. The chase 8, as will be noted, forms with the plate 6 a pocket 11 adapted for the reception of a quantity of depolarizing mix 12 consisting, for example, of suitable proportions of manganese, graphite and sal ammoniac. This depolarizing mix is introduced into the pocket 11 in a sufficient quantity to completely fill the same and is of a more or less plastic nature due to the presence of moisture therein.

In carrying out the process in accordance with the disclosure of Figures 1 to 3, inclusive, the depolarizing mix is first subjected to initial compression by means of a compression die member 13 having a protruding area 14 adapted to enter the chase 8, as shown, for a predetermined distance. As a result of this initial compression a sufficient space is afforded at the top of the depolarizing mix, upon removing the die member 13, to accommodate a quantity of graphite which is introduced into the chase 8 and spread over the surface of the depolarizing mix to form a graphite layer 15, the upper surface of which lies flush with the upper face of the chase 8. In preparing the graphite I mix with the same a suitable quantity of wax after which the mixture is ground into powdered form, the wax being evenly distributed with respect to the graphite and serving to render the graphite mass impervious to moisture after compression, as will be readily understood.

After the layer of graphite has been introduced into the die, as shown in Figure 2, the same is heated, as by means of a blow torch, for the purpose of softening the wax in order to render the mass more or less plastic, thus enabling it to readily respond to a compression force to be subsequently exerted thereupon. After heating the graphite layer, however, a metallic facing such for example as tinfoil 16, is placed upon the graphite layer, as shown in Figure 2. With the tinfoil so positioned the depolarizing mix, graphite layer, and tinfoil are collectively subjected to compression by means of a plunger or die member 17 adapted to enter the chase 8. The lower or compression face of this die member is serrated, as shown, thus forming a plurality of grooves and ridges 18 and 19, respectively. The purpose of the serrations, formed in the die member 17, is to produce a complementary serrated face upon the graphite layer which becomes, as a result of compression, a compact mass adapted to be utilized as the graphite or positive element of a cell with which the unit is adapted to be used. Inasmuch as a serrated face is formed, on the graphite element, complementary to the serrated face of the die member 17, it follows that the metallic facing 16 assumes a corrugated contour and thus provides for a somewhat increased contact area with the graphite. Not only is a relatively large contact area thus afforded between the facing and graphite which is responsible for a minimum resistance to an electric current flowing from one of these elements to the other, but by reason of such corrugations and serrations as are formed in the tinfoil and graphite element, respectively, a highly effective physical union is established between these elements.

In subjecting the graphite layer to compression incident to the final compression of the depolarizing mass the plunger or die member 17 is moved into the chase 8 to such an extent that the upper face of the graphite element lies preferably flush with the corresponding edge of the frame 10, as shown. Inasmuch as the depolarizing mix 12 and the graphite layer 15 are both more or less plastic or yieldable under the influence of final compression, the line of jointure intermediate the depolarizing mix and graphite is distorted, due to possible variations in mass density of the depolarizing mix and graphite, from a straight line contact, as shown in Figure 3, to an irregular contact between adjoining surfaces as indicated by the undulatory line of demarcation 20. The irregularity thus produced between contacting faces of the depolarizing mass and graphite element, as will be readily understood, serves to provide for a more intimate and permanent keying engagement between the graphite and the depolarizing mass than if these two component materials were united on a straight plane such as exists between the depolarizing mass and graphite layer at the outset of the final compression.

Upon the completion of the final compression the unit comprising the frame 10, depolarizing material 12, layer of graphite, compressed to provide the positive electrode and the metallic layer 16, may be readily removed as a compact and intimately united structure ready to be incorporated into a cell or battery such as that disclosed in my pending application Serial No. 739,278, filed September 23, 1924, from which the greater part of this application has been divided out.

In carrying out the invention in accordance with the disclosure of Figure 4, the die plate or member 21, corresponding to the die member 13 hereinbefore described, instead of having a plain compression face as shown in Figure 1 is serrated as indicated by the numeral 22 so that the depolarizing material 12 when subjected to initial compression is provided with a corresponding roughened or serrated upper face as indicated in Figure 4. By providing such a serrated or undulatory face on the depolarizing mix I am enabled possibly to obtain a somewhat more intimate and permanent keying or binding relation between the depolarizing mix and the graphite element than is possible in the form of my invention disclosed in Figures 1 to 3, inclusive, for the reason that in addition to the general irregularities existing between the adjacent contact surfaces of the depolarizing mix and graphite, shown in Figure 3, a further keying relation is set up between the depolarizing mix and the graphite mass for the reason that the latter is forced into the grooves or interstices present in the depolarizing mass as shown in Figure 5.

The types of cell units produced in accordance with the methods hereinbefore described are particularly adapted for use in connection with cells entering into batteries of the type disclosed in my above mentioned pending application, but in the case of cells entering into batteries of the type disclosed in my application Serial No. 755,879, filed Dec. 15, 1924, I prefer to provide protuberances upon the positive elements of the several cells. The protuberances may be readily formed by so shaping the final compression die member 17' as to provide therein a pocket 23, as shown in Figure 6, corresponding in shape and size to the shape and size of the protuberance desired. It will be appreciated, therefore, that when the die member 17' is introduced into the die or mold to compress the graphite layer and subject the depolarizing mass 12 to final compression the graphite element thus produced is formed with a protuberance 24 bounded by a ledge 25, the ledge as well as the protuberance being provided with the metallic facing 15 applied and keyed to the graphite element as hereinbefore described.

While I have illustrated the depolarizing mass 12 in Figure 6 as having been initially compressed with the form of die member 21 shown in Figure 4 it does not follow that the form of die member 13 shown in Figure 1 may not be used if desired, to exert the initial compression upon the depolarizing mass thus providing for a straight line contact between the depolarizing mass and graphite element.

Having thus described my invention I claim:

1. A cell unit comprising a frame of nonconducting material, a quantity of depolarizing material molded into said frame in plate form, and a quantity of carbonaceous material molded into said frame in plate form and physically united to said depolarizing material.

2. A cell unit comprising a quantity of depolarizing material compressed into cake form, a quantity of carbonaceous material carried upon one surface of said depolarizing material, said carbonaceous material being compressed to intimately unite the same with said depolarizing material and to provide a protruding area thereon.

3. A cell unit comprising a quantity of depolarizing material compressed into the form of a cake having an undulatory surface, a quantity of carbonaceous material carried upon said cake, said carbonaceous material being compressed to provide an electrode element having an undulatory surface complementary to the undulatory surface of said depolarizing material and having a protruding area provided with an irregular surface, and a conducting material carried by and conforming to the irregularity of said irregular surface.

4. The process of producing a cell unit which consists in compressing a quantity of depolarizing material into cake form, superimposing upon the material a quantity of carbonaceous material having an impregnating substance mixed therewith, subjecting the carbonaceous material to heat, and compressing the same into the form of an electrode element and at the same time physically uniting the electrode element with said depolarizing material.

5. The process of producing a cell unit which consists in compressing a quantity of depolarizing material into cake form, superimposing upon the material a quantity of carbonaceous material having an impregnating substance mixed therewith, subjecting the carbonaceous material to heat, superimposing upon the carbonaceous material a metallic conductor and subjecting the conductor, carbonaceous material and depolarizing material to pressure whereby the conductor, carbonaceous material and depolarizing material are physically united.

6. The process of producing a cell unit which consists in compressing a quantity of depolarizing material into the form of a cake, superimposing upon the said depolarizing material a carbonaceous material having an impregnating substance mixed therewith, subjecting the carbonaceous material to heat, applying a metallic conductor to said carbonaceous material, subjecting the conductor, carbonaceous material and depolarizing material to pressure to produce a unitary structure and simultaneously forming an irregular surface upon said carbonaceous material and causing the conducting material to conform to the irregularities of said irregular surface.

7. The process of producing a cell unit which consists in introducing into a frame a quantity of depolarizing material, subjecting the depolarizing material to pressure to produce a cake of such material, superimposing upon the said material a quantity of carbonaceous material, subjecting the carbonaceous material and depolarizing material to pressure whereby the two materials are united to each other and to said frame.

8. The process of producing a cell unit which consists in introducing into a frame a quantity of depolarizing material, subjecting the depolarizing material to pressure to produce a cake of such material, superimposing upon said material a quantity of carbonaceous material, superimposing upon said carbonaceous material a conducting material, subjecting the conducting material, carbonaceous material and depolarizing material to pressure whereby said carbonaceous material is united respectively to said conducting and depolarizing materials and whereby said carbonaceous material and depolarizing material are united to said frame.

9. The method of preparing a positive cell unit of the character described which consists in placing a non-conducting frame within a die, placing a layer of depolarizing mixture and a layer of impregnated graphite within said frame, placing a metallic conductor on said graphite layer, then compressing the said layers and metallic conductor to form a plate within the die and frame in the presence of heat.

In testimony whereof, I have affixed my signature to this specification.

HENRY M. ROSENDAL DAM.